(No Model.)

2 Sheets—Sheet 1.

G. P. FENNER.
PRINTING PRESS.

No. 311,735.

Patented Feb. 3, 1885.

WITNESSES:
William Miller
Chas. Wahlers

INVENTOR
George P. Fenner
BY
Van Santvoord & Hauff
ATTORNEYS (No Model.)

G. P. FENNER.
PRINTING PRESS.

No. 311,735. Patented Feb. 3, 1885.

WITNESSES:
William Miller
Chas. Wahlers.

INVENTOR
George P Fenner
BY
Van Santvoord & Hauff
ATTORNEYS

UNITED STATES PATENT OFFICE.

GEORGE P. FENNER, OF NEW LONDON, CONNECTICUT.

PRINTING-PRESS.

SPECIFICATION forming part of Letters Patent No. 311,735, dated February 3, 1885.

Application filed March 20, 1884. (No model.)

*To all whom it may concern:*

Be it known that I, GEORGE P. FENNER, a citizen of the United States, residing at New London, in the county of New London and State of Connecticut, have invented new and useful Improvements in Printing-Presses, of which the following is a specification.

This invention relates to cylinder printing-presses; and it consists in the novel means hereinafter described for regulating the motion of the "sliders" connecting together the rollers which support the type-bed.

Figure 1:
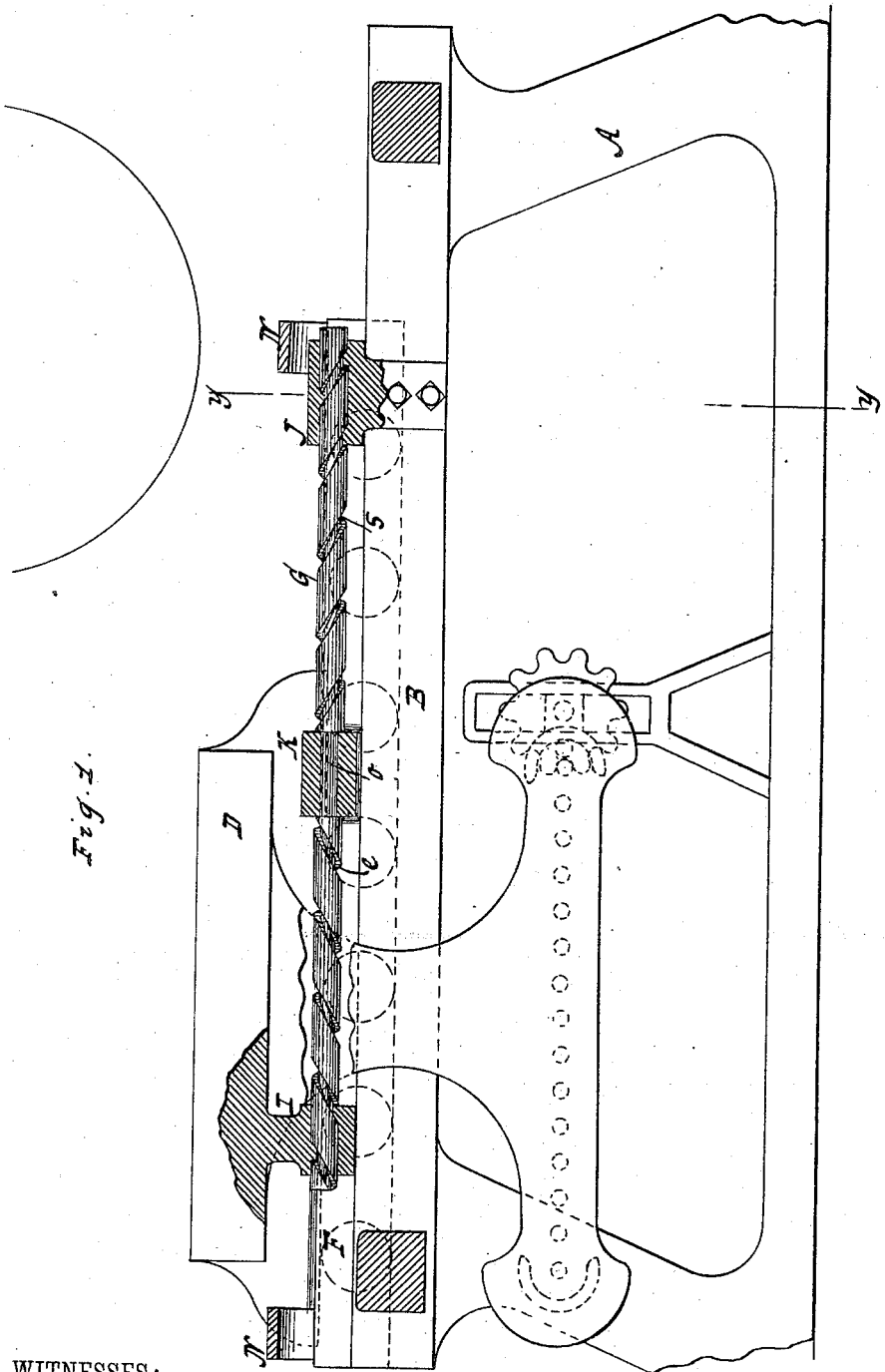
Figure 2:
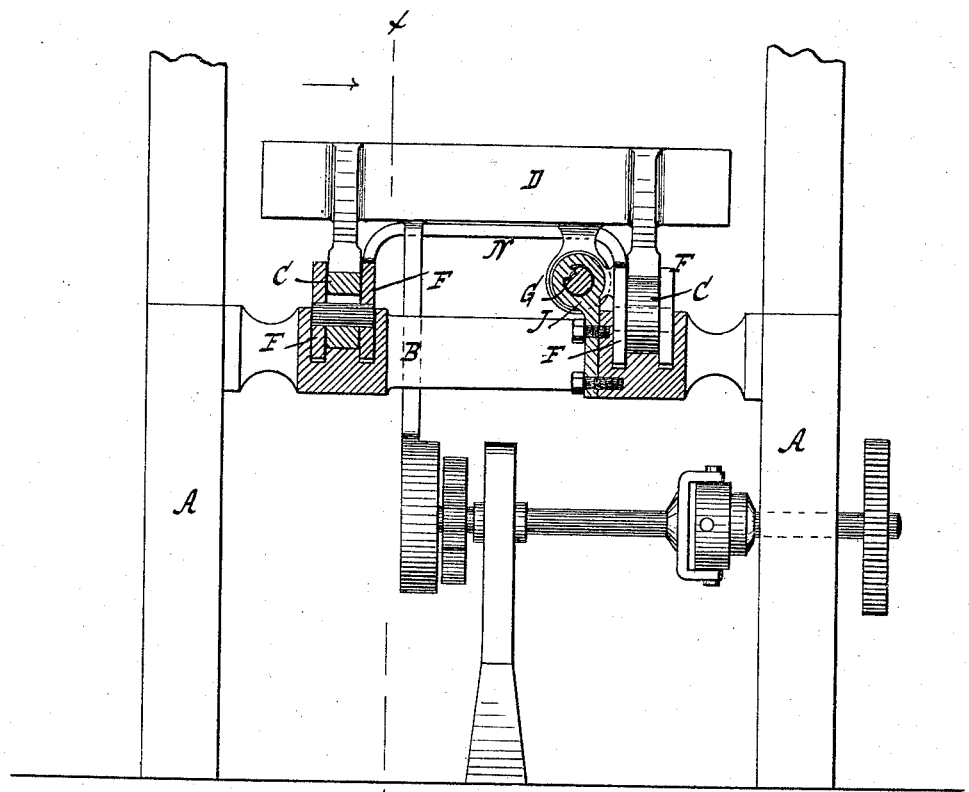
Figure 3:
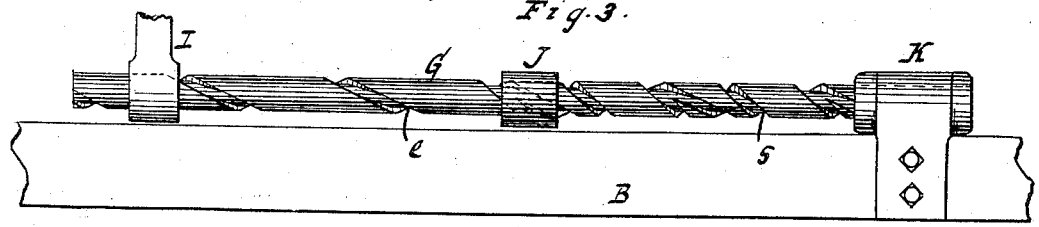

In the accompanying drawings, Figure 1 is a longitudinal section of a portion of a press embodying my invention, the plane of section being indicated by the line $x$ $x$, Fig. 2. Fig. 2 is a cross-section on the line $y$ $y$, Fig. 1. Fig. 3 shows a modification.

Similar letters indicate corresponding parts.

The letter A designates the press-frame, constructed with a track, B, on which travel the rollers C, supporting the type-bed D; and F denotes the sliders connecting the rollers together. Two sets of rollers are used, and two sliders to each set of rollers, as shown in Fig. 2, the sliders consisting of flat bars in which the rollers are journaled at equal distances apart from each other.

The letter G indicates a bar of cylindrical form, having two spiral grooves, $e$ $s$, by one of which it engages a nut, I, on the type-bed, so that in the reciprocating motion of the bed a rotating motion is imparted to the bar alternately in opposite directions by the action of the nut.

Referring to Figs. 1 and 2, the second groove, $s$, of the rotating bar G extends in an opposite direction to the groove $e$, and by its means the bar engages a nut, J, on the roller-track B, while by an intermediate journal, $o$, the bar engages a bearing, K, on the sliders F, so that in the rotating motion of the bar it also obtains a reciprocating motion from the nut of the track, and such motion being imparted to the sliders through the journal bearing, the motion of the sliders, together with the rollers, is regulated by that means. The spiral grooves $e$ $s$ correspond in pitch to each other, and their pitch is graduated to produce the required motion of the sliders.

In the modification represented in Fig. 3 the grooves $e$ $s$ of the rotating bar extend in the same direction, but with a different pitch, one the whole length of the bar and the other half the length thereof, and the nut J is on the sliders, it engaging with the groove of the greatest pitch, while the journal-bearing K is on the roller-track, so that the rod obtains a rotating motion from the nut I of the bed, but remains stationary endwise.

The action of the rotating bar G is on the sliders F of one set of rollers, whether by means of the journal-bearing K, as in Figs. 1 and 2, or by means of the nut J, as in Fig. 3, and, to render the bar common to the sliders of both sets of rollers, the sliders are connected together by girders N or other suitable means, the girders, when such are used, extending from the inner slider of each set of rollers, as shown in Fig. 2.

What I claim as new, and desire to secure by Letters Patent, is—

1. The combination, substantially as hereinbefore described, with the type-bed, the bed-supporting rollers, the sliders connecting the rollers together, and the roller-track, of the nuts, the journal-bearing, and the rotating bar having two spiral grooves engaging the nuts, respectively, and a journal engaging the journal-bearing.

2. The combination, substantially as hereinbefore described, with the type-bed, the bed-supporting rollers, the sliders connecting the rollers together, and the roller-track, of the nuts on the bed and track, respectively, the journal-bearing on the sliders, and the rotating bar having spiral grooves extending in opposite directions to engage the nuts, and a journal intermediate of the grooves to engage the journal-bearing.

In testimony whereof I have hereunto set my hand and seal in the presence of two subscribing witnesses.

GEORGE P. FENNER. [L. S.]

Witnesses:
CHARLES B. MAXSON,
GEORGE COLFAX.